United States Patent
Griffith et al.

(10) Patent No.: US 11,086,417 B2
(45) Date of Patent: Aug. 10, 2021

(54) STYLUS FOR ADDRESSING MAGNETICALLY-ACTUATED DISPLAY MEDIUM

(71) Applicant: E INK CORPORATION, Billerica, MA (US)

(72) Inventors: Evan Griffith, Marlborough, MA (US); Samantha Morrill, Nashua, NH (US); Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/987,722

(22) Filed: Aug. 7, 2020

(65) Prior Publication Data
US 2021/0041967 A1  Feb. 11, 2021

Related U.S. Application Data

(60) Provisional application No. 62/884,665, filed on Aug. 8, 2019.

(51) Int. Cl.
*G06F 3/0354* (2013.01)
*G09G 3/34* (2006.01)
*G06F 3/046* (2006.01)

(52) U.S. Cl.
CPC .......... *G06F 3/03545* (2013.01); *G06F 3/046* (2013.01); *G09G 3/344* (2013.01)

(58) Field of Classification Search
CPC .............. G06F 3/03545; G06F 3/0442; G06F 3/04162; G06F 3/0441; G02F 1/167; G09G 3/344
See application file for complete search history.

(56) References Cited

U.S. PATENT DOCUMENTS

| | | |
|---|---|---|
| 5,872,552 A | 2/1999 | Gordon, II et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,583,780 B1 | 6/2003 | Kawai |

(Continued)

FOREIGN PATENT DOCUMENTS

EP   2743798 A1   6/2014

OTHER PUBLICATIONS

Korean Intellectual Property Office, PCT/US2020/045360, International Search Report and Written Opinion, dated Nov. 13, 2020.

(Continued)

*Primary Examiner* — Koosha Sharifi-Tafreshi
(74) *Attorney, Agent, or Firm* — Brian D. Bean; Jason P. Colangelo (57) ABSTRACT

A stylus for interacting with a magnetic writing medium, such as a magneto-electrophoretic media containing magnetic particles that can be switched electrically in the same way as a conventional electrophoretic display: e.g., between white and black states with the capability of also attaining stable intermediate states of gray. The stylus includes a magnetic sphere and a metal cylinder aligned in the tip.

16 Claims, 4 Drawing Sheets

(56) References Cited

U.S. PATENT DOCUMENTS

| | | | |
|---|---|---|---|
| 6,672,921 | B1 | 1/2004 | Liang et al. |
| 6,788,449 | B2 | 9/2004 | Liang et al. |
| 6,831,771 | B2 | 12/2004 | Ho et al. |
| 6,866,760 | B2 | 3/2005 | Paolini, Jr. et al. |
| 6,870,661 | B2 | 3/2005 | Pullen et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,075,502 | B1 | 7/2006 | Drzaic et al. |
| 7,116,318 | B2 | 10/2006 | Amundson et al. |
| 7,145,555 | B2 | 12/2006 | Taylor et al. |
| 7,304,787 | B2 | 12/2007 | Whitesides et al. |
| 7,312,784 | B2 | 12/2007 | Baucom et al. |
| 7,352,353 | B2 | 4/2008 | Albert et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,535,624 | B2 | 5/2009 | Amundson et al. |
| 7,679,814 | B2 | 3/2010 | Paolini, Jr. et al. |
| 7,839,564 | B2 | 11/2010 | Whitesides et al. |
| 7,999,787 | B2 | 8/2011 | Amundson et al. |
| 8,009,348 | B2 | 8/2011 | Zehner et al. |
| 8,319,759 | B2 | 11/2012 | Jacobson et al. |
| 8,994,705 | B2 | 3/2015 | Jacobson et al. |
| 9,114,663 | B2 | 8/2015 | Ho et al. |
| 10,372,008 | B2 | 8/2019 | Telfer et al. |
| 2003/0067427 | A1* | 4/2003 | Comiskey ............ G02F 1/1345 345/84 |
| 2008/0297489 | A1* | 12/2008 | Funo ..................... G06F 3/041 345/175 |
| 2013/0009907 | A1 | 1/2013 | Rosenberg et al. |
| 2017/0061895 | A1* | 3/2017 | Paolini, Jr. ........... G06F 3/0354 |
| 2018/0164930 | A1 | 6/2018 | Goh |
| 2018/0247598 | A1* | 8/2018 | Sainis ................ G02F 1/13439 |
| 2018/0319201 | A1* | 11/2018 | Koga ................... B43K 23/001 |

OTHER PUBLICATIONS

Henzen, A. et al., "The present and future of electronic paper", SID vol. 14, Issue 5, pp. 437-442 (May 2006).

\* cited by examiner

STYLUS FOR ADDRESSING MAGNETICALLY-ACTUATED DISPLAY MEDIUM

RELATED APPLICATIONS

This application claims priority to U.S. Provisional Patent Application No. 62/884,665, filed Aug. 8, 2019. All patents, patent applications, and references disclosed are incorporated by reference in their entireties.

BACKGROUND

The technology described herein relates to magnetically-addressable displays and related apparatus and methods.

For decades it has been a goal of electronic paper research to match the experience of writing on paper, or, at in a larger format, to mimic the feel and appearance of drawing on a chalk board or a white board. See, A. Henzen, J. van de Kamer, "The present and future of electronic paper," *Journal of the S.I.D.* 14/5, 437-442 (2006). Because electrophoretic displays are Lambertian reflectors of ambient light with excellent contrast ratios both indoors as well as in direct sunlight, they provide a paper-like reading and viewing experience. However, current commercial embodiments of writable electrophoretic devices require tens of milliseconds for each electrical image refresh. Thus, when a stylus interacts with the display medium via a touch sensor, there are additional delays in conveying information about a line to be rendered by the display controller. The result is a latency between the act of writing and the appearance of an image on the display that can be on the order of 50-100 milliseconds. See, e.g., SONY DPT-RP1, writeable tablet, which includes an electrophoretic display manufactured by E Ink Corporation.

It would be preferred to have a method for directly writing onto an electronic/rewriteable ink with a stylus that could be located in great proximity to the active layer, thereby increasing the natural feedback of moving a stylus and seeing the image created below. Simple devices with such response have been known for some time, however they have more typically been incorporated into toys. For example, a magnetic drawing board including a suspension of ferromagnetic particles that is addressed by a magnetic pen or magnetic stamps. A rudimentary product including this technology was developed by Pilot Corporation in the 1970s, which was improved to become the child's toy MAGNA DOODLE (now produced by Cra-Z-Art, Randolph, N.J.). See, U.S. Pat. No. 4,143,472.

Since this time, E Ink Corporation, SiPix Imaging Inc., and Seiko Epson, have all disclosed magnetically-addressable electrophoretic display designs in which at least a portion of the charged pigment particles used in conventional electronic paper displays have been replaced by charged ferromagnetic particles. See, U.S. Pat. Nos. 6,583,780; 6,831,771; 6,870,661; and 7,352,353. The disclosed constructions produced reflective (sunlight-readable) display media responsive to both electric and magnetic fields. As such, these magneto-electrophoretic displays may be addressed with a magnetic stylus or with electric fields. Additionally, the electronic display may be synchronized to activate pixels corresponding to those over which the stylus passed, e.g., using a digitizer.

SUMMARY

The invention includes a stylus that is specially designed to interact with a magnetic writing surface. The stylus is engineered to provide a smoother writing experience while avoiding "shadows" created by the opposite magnetic pole of a small magnetic element suitably sized to fit at the end of the stylus.

Generally, the invention includes a stylus for creating an image on a magnetically-responsive display surface. The stylus includes a handle portion having first and second ends, a tip portion coupled to the first end of the handle portion, wherein the tip portion is substantially cone shaped and has a cone angle between 40 and 75 degrees (as measured when the stylus is held perpendicular to a flat surface). Disposed at the distal end of the tip portion is a magnetic sphere, having a radius r. Less than a hemisphere of the magnetic sphere extends beyond the distal end of the tip portion. In addition to the magnetic sphere, the distal end of the tip portion also includes a metal cylinder that is disposed proximal to the magnetic sphere. The metal cylinder having a radius between 0.5r and 2r and having a length of at least 3r.

In some embodiments, the metal cylinder disposed within the tip portion comprises a ferromagnetic material. In some embodiments, the tip portion includes a polymer. In some embodiments, the radius of the cylinder is r. In some embodiments, the cone angle is between 50 and 70 degrees. In some embodiments, the magnetic sphere has a magnetic field strength between 300 and 3000 Gauss at the surface of the sphere. In some embodiments, the portion of the magnetic sphere extending sphere extending beyond the distal end of the tip portion is coated with a second polymer, such as a fluoropolymer of polyethylene, polypropylene, alkoxy alkanes, or copolymers including these fluoropolymers. In some embodiments, a second magnet disposed at the second end of the handle portion of the stylus. In some embodiments, r is between 0.5 mm and 6 mm. In advanced embodiments, the stylus may additionally include an electronic circuit configured to interact with a writing digitizer.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The invention relates to styli for interacting with a magnetic writing medium, such as a magneto-electrophoretic media containing magnetic particles that can be switched electrically in the same way as a conventional electrophoretic display: e.g., between white and black states with the capability of also attaining stable intermediate states of gray.

Figure 1:
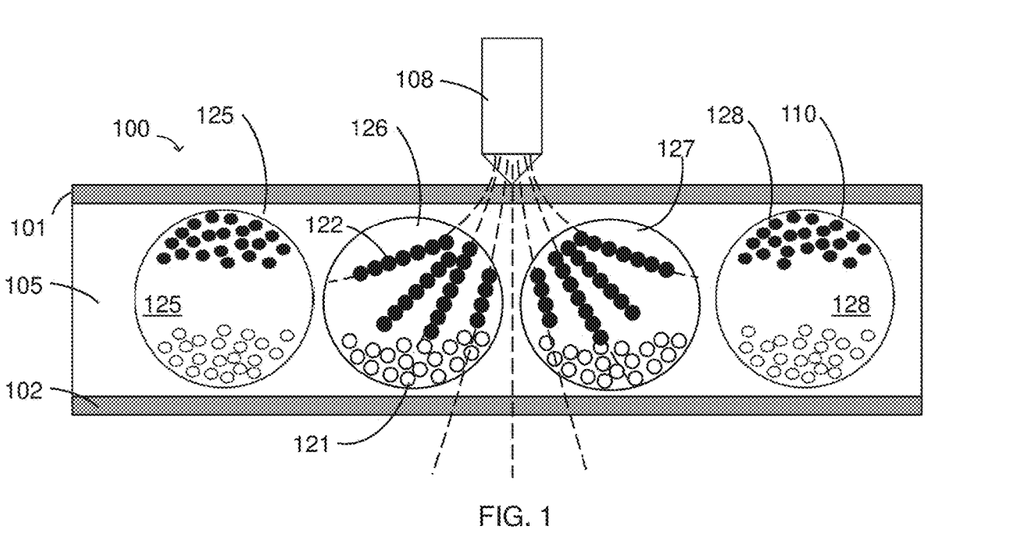
FIG. 1 is a schematic drawing depicting a magneto-electrophoretic display including black magneto-electrophoretic particles and white non-magnetic electrophoretic particles. The black and white particles have opposite electric charges. An exemplary magnetic stylus causes a local change in an optical state of a display by causing chaining of magnetic particles, whereby an observer can see the white pigments below the black magneto-electrophoretic particles.
Figure 2:
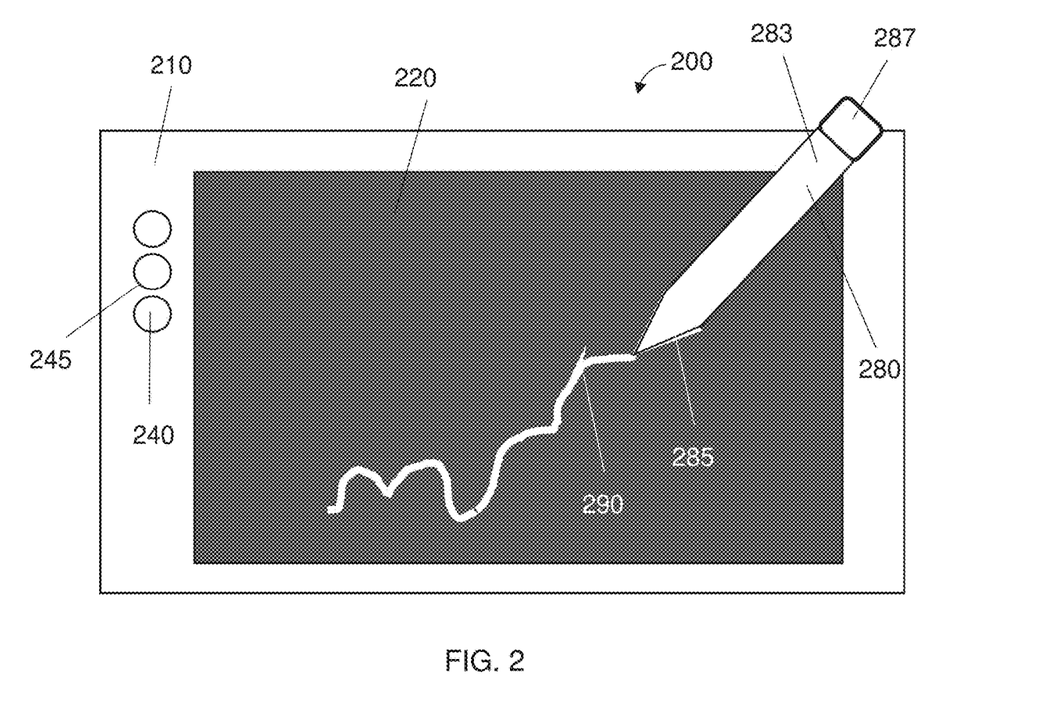
FIG. 2 illustrates the use of a magnetic stylus to address a magneto-electrophoretic display.

As shown in FIGS. 1 and 2, when addressed with a magnetic stylus, the magneto-electrophoretic media fluid exhibits a gray state that is intermediate in optical density between the extreme electrophoretic white and black states. Thus, starting from a white state, the magnetic stylus can produce a relatively dark image, while starting from a black state a lighter image can be formed. The magneto-electrophoretic media display can be combined with segmented electrodes to produce a very large area writable surface (i.e., a magnetically-addressable writing board), or used in conjunction with a TFT backplane to make a graphics-capable display that can be electrically addressed, but has the additional capability of being writable with a magnetic stylus with no visible latency. If desired, the initially produced, magnetically-written image can be subsequently refreshed by electrical addressing to provide higher contrast, straighter lines, digitized characters, etc.

The term "writing implement" or "stylus" as used herein includes any suitable handheld device, such as those shaped like a pencil, a pen or a marker. For example, a magnetic marker may generate a magnetic field and may be used to magnetize regions of a magnetizable material.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme that only drives pixels to their two extreme optical states with no intervening gray states. Further, as used herein, the extreme states include the dark and light states resulting from driving an display magnetically, which typically do not achieve the extreme black and white states but achieve dark gray (almost black) and light gray (almost white) states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As used herein, an "image" refers to a spatial representation, and is to be distinguished in at least some embodiments from data (e.g., digital 1's and 0's) from which an image may be derived. As will be described further below, images according to embodiments of the present application may include a picture, text, shapes, or any other pattern, and in some embodiments may be embodied as any arrangement or pattern of magnetized regions of a magnetic recording layer that may be transferred or reproduced on a magnetically responsive display. An image may be visible, for example when produced on a display as just described. However, an "image" as used herein may be invisible, at least to the naked eye, in some embodiments. For example, as described herein, an image may be embodied as magnetized regions of a magnetic recording layer. The spatial representation of the magnetized regions may be invisible to the naked eye, but nonetheless represent an image, for example a picture, text and/or shapes.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 6,870,661, 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600, 7,304,787 and 7,453,445;
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, in the name of SiPix Imaging, Inc., now in the name of E Ink California, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; 6,184,856; 7,304,787 and 7,999,787. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

In magnetically addressable displays having two particles, for example, black and white particles, magnetic addressing only generates gray states of varying degrees of lightness or darkness. The magnetic field may be tuned to the desired gray state. Electrical switching, i.e., an electro-optic display, is required to drive the particles to achieve full black and white optical states. In magnetically addressable displays, the black state is not required to be fully black, simply dark. Likewise, the white state is not required to be fully white, simply light. The focus is on the difference between the background and the magnetically addressed area to display the image. As used herein, black state refers to the dark state, including the fully black state associated with electrical addressing, and white state refers to the light state, including the fully white state associated with electrical addressing. From either optical state (dark or light), the magnetic stylus drives the pigment particles towards a gray state. From a black or dark state, the magnetic stylus switches the optical state toward a lighter gray state. From a white state or light state, the magnetic stylus switches the optical state toward a darker gray state.

As an alternative to addressing with a magnetic stylus or print head, regions of a magnetizable material within a recording layer (e.g., including a magneto-electrophoretic medium) may be magnetized via a fixed magnetic writing implement. The recording layer may be subsequently brought into proximity with a magnetically responsive display layer, thereby producing a facsimile of the regions of the magnetizable material previously magnetized by the writing implement. In some embodiments, regions of a magnetizable material may be magnetized by a magnetic writing implement while in proximity to a magnetically responsive display layer, such that the writing implement causes both a change in an optical state of the display layer in addition to magnetizing the regions of the magnetizable material. The recording layer may be separated from the display layer and subsequently brought into proximity with the same or a different display layer.

According to some embodiments, a magnetically responsive display layer within an electronic display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. According to some embodiments, a magnetically responsive display layer within a magnetically responsive (non-electronic) display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. In a multi-pigment display, pigment colors may be colors other than black and white. In multi-pigment displays, a color overlay may be used to change the perceived color of the pigment particles, especially when white pigment particles are included.

According to some embodiments, a particle-based display layer may include white and black pigment particles, black pigment particles may, in some states, be located toward the front of the display such that incident light is largely absorbed by the black particles. A magnetic field produced by an addressing magnet, e.g., a magnetic stylus, may change an optical state of the display such that the black particles clump, gather, or chain together thereby allowing the incident light to be reflected by the white particles underlying the black particles. The change in optical state may additionally include movement of the white and/or black particles within the display. Alternatively, a multi-pigment display may be configured to instead locate white pigment particles toward the front of the display such that incident light is largely reflected by the white particles. A magnetic field produced by a stylus may then change an optical state of the display such that more of the incident light is absorbed by the black particles. In such an embodiment, when black particles are moved toward the front of the display using a magnetic field, a dark gray state rather than an extreme black state occurs. Likewise, when white magneto-electrophoretic particles are moved towards the front of the display using a magnetic field, a light gray or white gray state occurs.

The particle-based electro-optic display may include one or more pigment types. In a multi-pigment display, at least one of the pigment types may be both electrically- and magnetically-controllable. An example of a multi-pigment display is a display including white pigment particles and black pigment particles. The black pigment particles may be both electrically and magnetically controllable, as an example. The black or the white pigments may be ferromagnetic or paramagnetic. Commercially-available magnetic particles, such as Bayferrox 8600, 8610; Northern Pigments 604, 608; Magnox 104, TMB-100; Columbian Mapico Black; Pfizer CX6368, and CB5600 and the like, may be used alone or in combination with other known pigments to create pigments that are both electrically and magnetically controllable. In general, magnetic particles having a magnetic susceptibility between 50-100, a coercivity between 40-120 Oersted (Oe), a saturation magnetization between 20-120 emu/g, and a remanence between 7-20 emu/g are preferred. Additionally, it may be beneficial for the particles to have diameters between 100-1000 nanometers (nm). As a specific, but non-limiting, example, the pigment of an electro-optic display in some embodiments may be a form of magnetite (Iron Oxide, such as Bayferrox 318M), neodymium oxide (such as Sigma Aldrich 634611 Neodymium (III) Oxide), iron and copper oxide (such as Sigma Aldrich Copper Ferrite), or an alloy of iron and cobalt or iron and nickel (such as Sigma Aldrich Iron-Nickel Alloy Powder and American Elements Iron-Cobalt Alloy Nano-powder).

The strength of the magnetic field produced by the stylus may also be at a level selected to provide beneficial operation of electro-optic display. For example, the magnetic field produced by the writing implement (e.g., stylus) may be at least 30 milliTesla (mT) (300 Gauss) as measured at the surface of the magnetic element. In practice, generating magnetic fields in excess of IT (10,000 Gauss) inside the ink may be technically and economically prohibitive. Thus, in some embodiments the magnetic field applied may be between 30 mT and 300 mT, for example between 300 Gauss and 3,000 Gauss, for example, between 800 Gauss and 2000 Gauss.

FIG. 1 depicts magneto-electrophoretic display layer that may be used as a magnetically-responsive writing material. Display 100 includes front and back electrodes 101 and 102, respectively. The front electrode 101 is light-transmissive while the back electrode 102 is optionally light-transmissive. The front electrode is typically formed from a transparent conductive polymeric medium such as PET-ITO or PEDOT, however alternative light-transmissive polymers (polyesters, polyurethanes, polystyrene) doped with conductive additives (metals, nanoparticles, fullerenes, graphene, salts, conductive monomers) are also suitable for use. The back electrode 102 may comprise any of the components listed for the front electrode 101, however the back electrode can also be a metal foil, a graphite electrode, or some other conductive material. (A segmented or TFT backplane can be also be used instead of the back electrode 102 to add more versatility in displaying printed and graphic information.) In many embodiments, both the front and back electrodes 101 and 102, respectively, are flexible, thus the entire display 100 is also flexible. The display 100 is often supported by a substrate 130, which may also be light-transmissive and/or flexible. While not shown in FIG. 1, it is understood that that one or more adhesive layers are included in the construction in order to facilitate roll-to-roll processing as well structural integrity. Also not shown in FIG. 1 is the binder used to fill the gaps between microcapsules 110. The display 100 may additionally include a top protective sheet (not shown) to protect the front electrode 101 from being damaged by a stylus or other mechanical interaction. Filter layers (not shown) to change color or protect the medium from UV exposure may also be included.

The display 100 includes a display layer 105, which is a particle-based display medium between electrodes 101 and 102 that includes a plurality of containers to segregate portions of the electrophoretic medium. In the instance of FIG. 1, the containers are microcapsules 110, and within the microcapsules 110 are liquid medium and one or more types of colored pigment particles, wherein at least one type of particle is magnetically-responsive. As shown in FIG. 1, this includes white pigment particles 121 and black pigment particles 122. One or both of pigments 121 and 122 may move within, or otherwise respond to, a magnetic field. For example, one or both types of pigment particles may align along magnetic field lines, and/or may form chains of particles. In such cases, one or both of pigments 121 and 122 may be electrically charged. The pigment particles 121 and/or 122 may be controlled (displaced) with an electric field (e.g., produced by electrodes 101-102), thus making the display 100 operate as an electrophoretic display when addressed. In addition, as depicted in FIG. 1, the black pigment particles 122 are magnetically-responsive. It is understood that the capsules 110 could be replaced with microcells or polymer-dispersed droplets, as discussed in the patents and patent applications, above.

In some use cases, both pigments 121 and 122 may be configured to be displaced within an electric field. For example, one of pigments 121 and 122 may be positively charged and the other pigment may be negatively charged, such that an electric field applied across capsule 110 causes the pigment particles to separate to opposing sides of the capsule. By adjusting the direction of the electric field, the pigment that is located on the viewing side of the display 100 may be selected, thereby producing either a white or a black state as viewed by a user of the display.

As shown in FIG. 1, a generalized stylus 308 causes a change in an optical state of the display 100. The stylus 108 produces a magnetic field depicted in part by field lines 110 that causes black pigment particles 122 to form chains. Due to the shape and structure of the chains of black pigment particles, light entering display 100 from the viewing side may largely pass by black pigment chains 122 and be reflected from the white pigment particles 121. Accordingly, in the configuration shown in FIG. 1, capsules 126 and 127 will appear white (i.e., light gray), whereas capsules 125 and 128 will appear black (i.e., dark gray), on the viewing side of the display 100. Accordingly, where a stylus 108 causes chaining of pigment particles 122, such as in capsules 126 and 127, a facsimile of a drawn image representing the motion of the stylus 108 will be visible at the viewing surface of the display 100. See also, FIG. 2, described below.

It will be appreciated that, although FIG. 1 illustrates an example of a display that is altered from a black state to a white state by a magnetic stylus, a display may similarly be produced that is altered from a white state to a black state by a magnetic stylus, and that FIG. 1 is merely one illustrative example of a display with which a magneto-electrophoretic display as described herein may be used.

FIG. 2 illustrates a writeable tablet 200 including a magnetically-actuated medium. The writeable tablet 200 includes an encapsulated magneto-electrophoretic display 220, and a stylus 280 that interacts with the display layer. As shown in FIG. 2, the writeable tablet 200 resembles a conventional electronic writeable tablet, including a housing 210 and interfacial controls 240, which can be real or virtual. As a user "writes" with the stylus 280 on the writeable medium 220, thereby creating a "stroke" 290 corresponding to an area of capsules in which the magnetic pigment particles have been chained (discussed above). In some embodiments, the "stroke" of the stylus may also be recorded by a digitizing layer that interacts with the stylus, for example through an inductive signal. As shown in FIG. 2, the stylus results in a "stroke" 290 that is white on a dark background. However, this is not limiting because it is also possible to write black on a white background by using white magnetic pigments or by driving the non-magnetic white pigment to the writing surface before writing.

The stylus 280, includes a handle portion 283 and a tip portion 285. The stylus 280 may additionally include a second magnet 287 located at the end of the handle portion 283 opposite from the tip portion 285. The tip portion will house a magnetic element that interacts with the encapsulated magneto-electrophoretic display 220.

Figure 3:
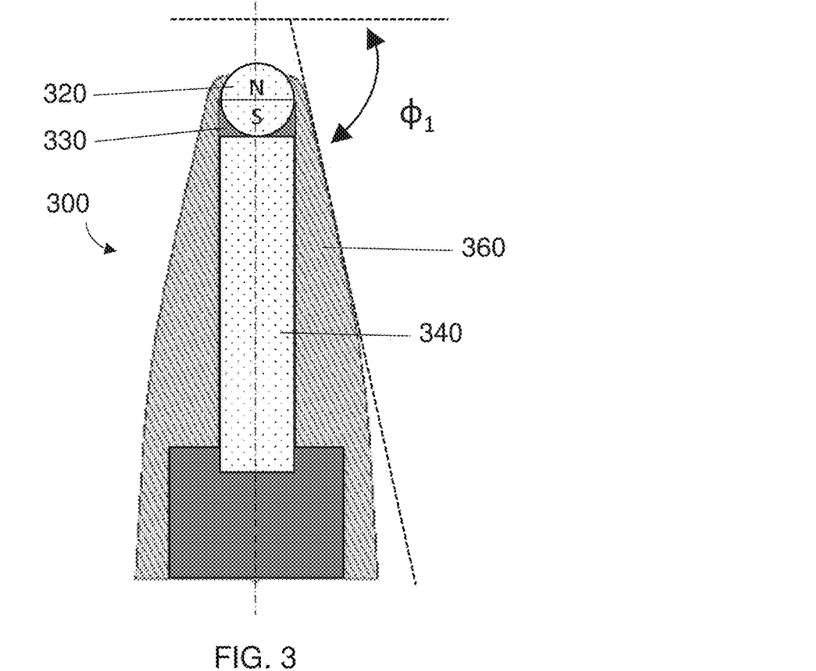
FIG. 3 depicts an embodiment of a stylus tip of the invention, including a tapered tip and a magnetic metal sphere disposed at the distal end of the tip along with a metal cylinder that improves the writing performance.

An exemplary stylus tip 300 is shown in FIG. 3, including a magnetic sphere 320 and a metal cylinder 340. The magnetic sphere 320 may be a neodymium magnet (N42, N45, N50 or N52; K&J Magnetics, Pipersville, Pa.), having a magnetic field strength between 300 and 3000 Gauss. The metal cylinder 340 may be an iron-containing wire, such as low-carbon steel wire (McMaster-Carr, Robbinsville, N.J.). The metal cylinder 340 may be constructed from a variety of metals having magnetic domains, such as steels, cast iron, iron alloys, etc. In some embodiments, the metal cylinder may be constructed from loose ferromagnetic materials that are immobilized in polymer or a ferromagnetic ceramic. The magnetic sphere 320 has a radius, r, which is defined in the standard way, i.e., from the center of the sphere to a surface of the sphere. See detail in FIG. 5. The metal cylinder 340 is typically about the same width as the magnetic sphere 320, but longer than the diameter of the magnetic sphere 320. In general the relationship between the radius, r', of the metal cylinder 340, the height, h, of the metal cylinder 340, and the radius, r, of the magnetic sphere 320 is $2r \le r' \le 0.5r$ and $50r \le h \le 3r$. In most embodiments, r is between 0.5 mm and 6 mm. Commonly, r=r'.

As shown in FIG. 3, it is preferable for the poles of the magnetic sphere to be aligned with the longitudinal axis (dash-dot line) of the stylus tip 300. Accordingly, a narrow and symmetric magnetic field radiates from the tip to produce narrower features when the stylus is used to address a magnetically-addressable medium. In some embodiments, a binder 330 may be used to retain the magnetic sphere 320 in position with respect to both the tip portion 360 and the metal cylinder 340. The binder may be a resin or some other polymer that hardens to keep the components of the tip in place. For example, the binder may comprise a polyurethane, a polyacrylate, a polyisocyanate, or a cyanoacrylate. In some embodiments, the binder may be used to bind the magnetic sphere 320 to the metal cylinder 340 before assembly of the stylus tip 300. In other embodiments, the binder 330 may be disposed in the tip portion 360 and then the magnetic sphere 320 and the metal cylinder 340 are inserted into the tip portion 360 before the binder 330 is cured. The magnetic sphere 320 can be aligned with the longitudinal axis of the stylus tip 300 during the curing with an external magnetic.

The tip portion 360 is shaped as a cone to improve the writing experience. Typically, the tip portion 360 has a cone angle, $\Phi_1$, between 40 and 75 degrees when the stylus is held perpendicular to a flat surface, as shown in FIG. 3. The tip portion 360 may be formed from any non-magnetic material, however higher strength polymers such as ABS plastic and nylons tend to work well. Alternatively, wood or wood composites may be used. Typically, the magnetic sphere 320 is retained by the distal end of the tip portion of the stylus, such that less than a hemisphere of the magnetic sphere 320 extends beyond the distal end of the tip portion 360. It has been found that a spherical magnetic writing interface is superior to a rectangular, cylindrical, or conical magnetic writing interface because these other shapes have sharp edges that scratch the magneto-electrophoretic display.

Figure 4:
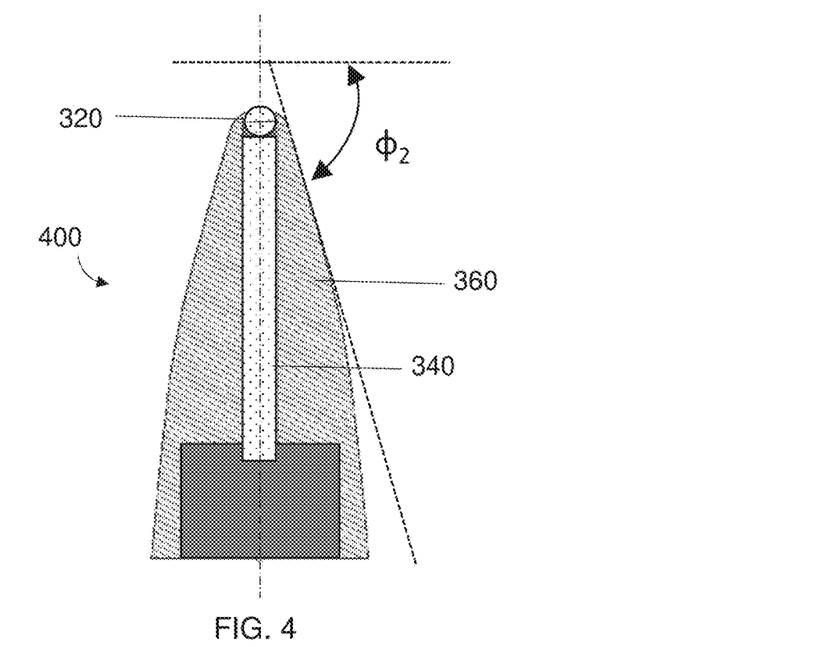
FIG. 4 depicts an embodiment of a stylus tip of the invention, including a tapered tip and a magnetic metal sphere disposed at the distal end of the tip along with a metal cylinder that improves the writing performance.

A second exemplary stylus tip 400 is shown in FIG. 4. The stylus tip 400 is functionally identical to the stylus tip 300 of FIG. 3, however the cone angle, $\Phi_2$, of stylus tip 400 is larger, better reproducing the feel of a pencil, as opposed to the stylus tip 300 of FIG. 3, which feels more like a pen. Additionally, because the radius of the magnetic sphere 320 is smaller in stylus 400, the resulting "stroke" is thinner. While it is not shown in FIG. 3 or 4, it is suitable to cover the end of the stylus tip (300 or 400) with a lubricious polymer, such as a fluoropolymer, for example fluoropolymers of polyethylene, polypropylene, alkoxy alkanes, or copolymers thereof.

Figure 5:
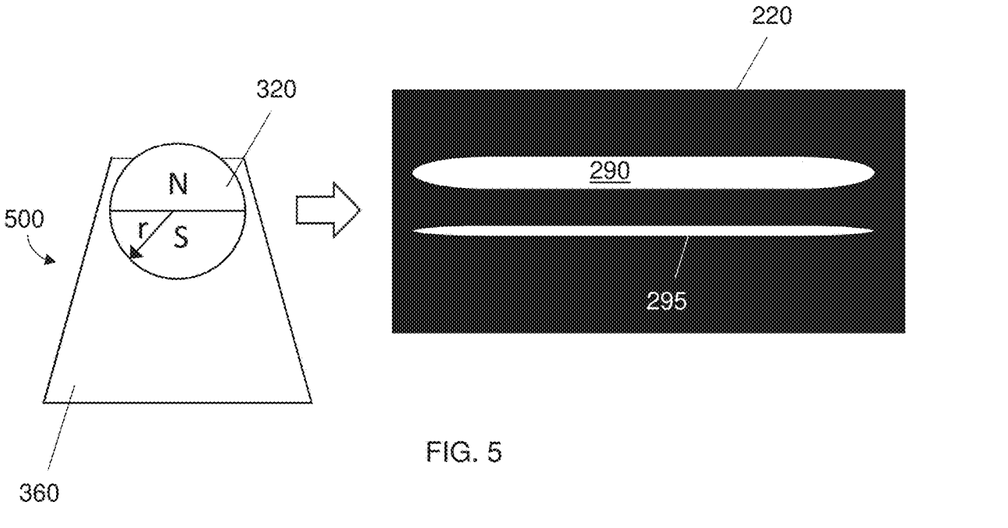
FIG. 5 illustrates the shadows that appear when a stylus having only a spherical magnetic element is used to draw a line on a magnetic writing medium. The shadow is likely caused by interactions between the magnetic pigments and the opposite magnetic pole of the spherical magnetic element.
Figure 6:
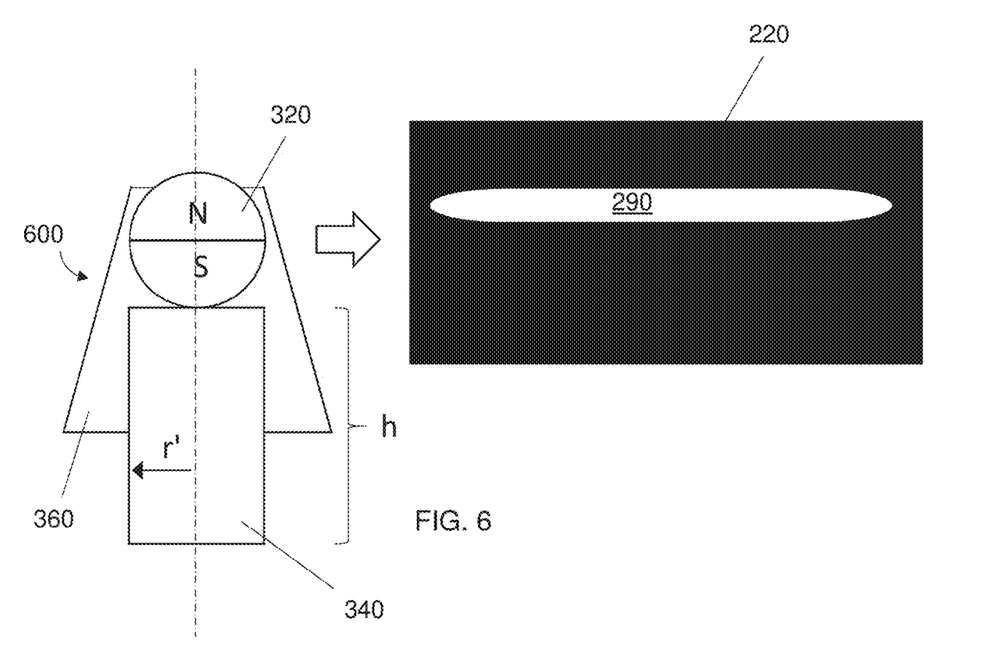
FIG. 6 illustrates the improved writing experience when a stylus having both a spherical magnetic element and a ferromagnetic cylinder is used to draw the same line as in FIG. 5.

The benefits of a magnetic stylus tip of the invention are illustrated in FIGS. 5 and 6. As shown in FIG. 5, a stylus tip 500 having only a magnetic sphere 320 disposed in the tip portion 360 will produce a clean "stroke" 290 when writing white on black on a magneto-electrophoretic display 220, however, there are often "ghost lines" 295 that appear alongside the stroke 290. This is likely due to interactions between the opposite pole of the magnetic sphere 320 and the magnetic particles. Because the visualization is driven by the chaining of the magnetic particles, and the subsequent visualization of the white pigment below the black pigment (as opposed to motion of the white particle toward the viewer), interactions between both the North and the South poles of the magnet cause a color change. (It is to be appreciated that North and South are completely arbitrary in the FIGS, and it is simply an interaction with both poles.) For more details of the magnetic chaining process, see US Patent Publication No. 2020/0201454, which is incorporated by reference in its entirety.

Figure 7:
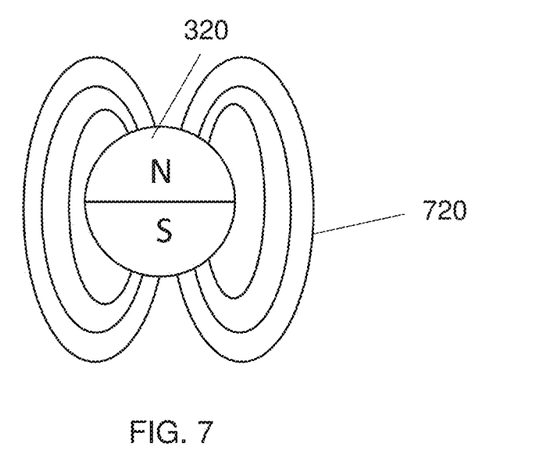
FIG. 7 is a conceptual diagram of the magnetic field lines of the tip shown in FIG. 5.
Figure 8:
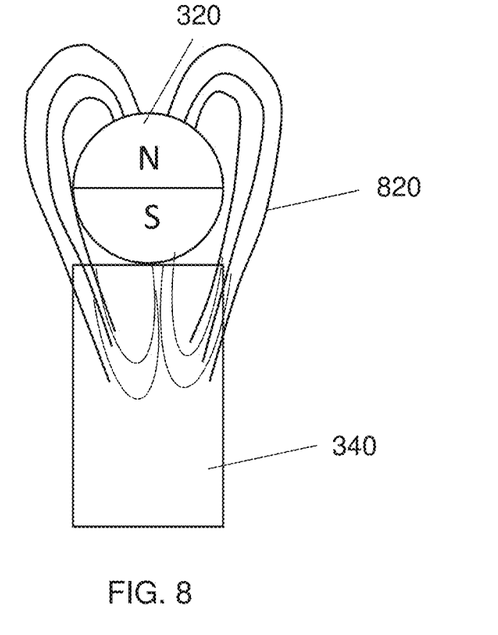
FIG. 8 is a conceptual diagram of the magnetic field lines of the tip shown in FIG. 6.

In contrast to using only a magnetic sphere 320 in the tip portion 360, it has been discovered that adding a metal cylinder 340 proximal to the magnetic sphere 320 changes the shape of magnetic field lines sufficiently that it is possible to achieve an optimum writing "feel" but without "ghost lines" 295. Such a stylus tip 600 produces an excellent writing experience. The shaping of the field lines by the metal cylinder 340 can be visualized with magnetic films (not shown). The field lines 720 of the magnetic sphere 320 are spherically symmetric, as expected, and extend between the North and South poles of the magnetic sphere 320, as shown in FIG. 7. The field lines 820 of the magnetic sphere 320, combined with the metal cylinder 340, are distorted by the domains of the metal cylinder 340 to produce an elongated heart shape. See FIG. 8. As a result of the field line distortion, a stylus tip 600 having this configuration does not cause unintended chaining of the magnetic pigments when interacting with a magnetic writing medium. See FIG. 6.

The styluses described herein allow fast natural handwriting at over 10:1 contrast ratio at speeds over 1 m/sec without any of the stylus lag notable for other electronic writing devices that utilize electronic touch screen interfaces. In some embodiments, styluses of the invention may additionally include a second magnet proximal to the second end of a handle portion, which may be a ferrite magnet or a striped pole magnet and have a magnetic field strength between 10 and 500 Gauss, for example between 50 and 200 Gauss. The stylus 1308 may also include a wireless transmitter (e.g., BLUETOOTH, ZIGBEE, or WIFI) as well as a switch 1340 on the body 1310 of the stylus 1308, operatively connected to the wireless transmitter. Thus, when used to address a magneto-electrophoretic display 220, the stylus 280 may be used in a manner similar to a pencil or pen, creating lines of text, drawings, etc., where the stylus has been placed. See FIG. 2. Furthermore, there is no need to supply power to the magneto-electrophoretic display, and the writing will maintain its appearance indefinitely without further power consumption.

In some embodiments, a system may include both a local and global erasing. That is, when it is desired to erase only a portion of the writing, a user will activate subthreshold electro-magnetic addressing (a.k.a. "erase") mode by interacting with a circuit that applies some voltage between the electrodes. Alternatively, the magneto-electrophoretic display 220 may include a global erase switch 240 and/or a local erase switch 245, thereby causing the controller to provide a suitable waveform, as described above. The global erase may also be activated with a separate switch on the stylus (not shown). Once the wireless transmitter has sent a signal to the voltage controller, the voltage controller will provide a subthreshold voltage waveform to the entire display. In some embodiments, the stylus may include a second magnet 287 that is sufficient to locally erase portions of the image. Typically, the second magnet 287 is weaker than the spherical magnet 320 disposed in the tip portion 360.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A stylus for creating an image on a magnetically-responsive display surface, the stylus comprising:
a handle portion having first and second ends;
a tip portion coupled to the first end of the handle portion, the tip portion being substantially cone shaped and having a cone angle between 40 and 75 degrees when the stylus is held perpendicular to a flat surface;
a magnetic sphere, having a radius r, disposed within a distal end of the tip portion and having less than a hemisphere of the magnetic sphere extending beyond the distal end of the tip portion; and
a metal cylinder disposed proximal to the magnetic sphere within the distal end of the tip portion, the metal cylinder having a radius between 0.5r and 2r and having a length of at least 3r.

2. The stylus of claim 1, wherein the metal cylinder comprises a ferromagnetic material.

3. The stylus of claim 1, wherein the magnetic sphere has a north magnetic pole and a south magnetic pole, and the north and south magnetic poles are aligned along the longitudinal axis of the stylus.

4. The stylus of claim 3, wherein the alignment of the magnetic sphere is retained by a binder in contact with the magnetic sphere and the tip portion, or in contact with the magnetic sphere and the metal cylinder.

5. The stylus of claim 1, wherein the tip portion comprises a first polymer.

6. The stylus of claim 1, wherein the radius of the metal cylinder is r.

7. The stylus of claim 1, wherein the cone angle is between 50 and 70 degrees.

8. The stylus of claim 1, wherein the magnetic sphere has a magnetic field strength between 300 and 3000 Gauss at the surface of the sphere.

9. The stylus of claim 1, wherein the portion of the magnetic sphere extending beyond the distal end of the tip portion is coated with a second polymer.

10. The stylus of claim 9, wherein the second polymer is selected from fluoropolymer of polyethylene, polypropylene, alkoxy alkanes, and copolymers thereof.

11. The stylus of claim 1, further comprising a second magnet disposed at the second end of the handle portion.

12. The stylus of claim 1, wherein r is between 0.5 mm and 6 mm.

13. The stylus of claim 1, further comprising an electronic circuit configured to interact with a writing digitizer.

14. A magnetic writing system comprising:
a magneto-electrophoretic display, including
a first light-transmissive electrode layer,
a second electrode layer, and
a magneto-electrophoretic media layer disposed between the first light-transmissive electrode layer and the second electrode layer; and
a stylus of claim 1.

15. The magnetic writing system of claim 14, wherein the magneto-electrophoretic media layer includes particles that move in both a magnetic and an electric field dispersed in a non-polar solvent.

16. The magnetic writing system of claim 15, wherein the particles of the magneto-electrophoretic media layer are encapsulated in microcapsules or microcells.

* * * * *